US011736941B2

(12) United States Patent
Liubinskas et al.

(10) Patent No.: US 11,736,941 B2
(45) Date of Patent: Aug. 22, 2023

(54) 5G NAS DECIPHERING ENHANCE RATE OF CONVERGENCE MECHANISM

(71) Applicant: NetScout Systems, Inc., Westford, MA (US)

(72) Inventors: Tauras Liubinskas, Lexington, KY (US); Subappriya Muthuchamy, Fremont, CA (US); Sandeep Prasad, Pleasanton, CA (US); Abhishek Saraswati, Santa Clara, CA (US); Alessandro Pinelli, Modena (IT); Pritish Vijay Aherrao, Pune (IN); Loreto Di Resta, Modena (IT); Brandon Bass, Flower Mound, TX (US)

(73) Assignee: NetScout Systems, Inc., Westford, MA (US)

( * ) Notice: Subject to any disclaimer, the term of this patent is extended or adjusted under 35 U.S.C. 154(b) by 76 days.

(21) Appl. No.: 17/409,196

(22) Filed: Aug. 23, 2021

(65) Prior Publication Data

US 2023/0007476 A1 Jan. 5, 2023

(30) Foreign Application Priority Data

Jun. 30, 2021 (IN) .............................. 202141029412

(51) Int. Cl.
*G06F 7/04* (2006.01)
*H04W 12/06* (2021.01)
(Continued)

(52) U.S. Cl.
CPC ........... *H04W 12/06* (2013.01); *H04W 12/03* (2021.01); *H04W 12/0431* (2021.01); *H04W 12/69* (2021.01)

(58) Field of Classification Search
CPC . H04W 12/06; H04W 12/03; H04W 12/0431; H04W 12/69
(Continued)

(56) References Cited

U.S. PATENT DOCUMENTS

| 2011/0150211 A1 | 6/2011 | Anderson |
| 2016/0269900 A1* | 9/2016 | Goldfarb ............. H04W 12/069 |

(Continued)

FOREIGN PATENT DOCUMENTS

| CN | 112291724 | 1/2021 |
| CN | 112822674 | 5/2021 |

(Continued)

OTHER PUBLICATIONS

PCT International Search Report and Written Opinion dated Sep. 30, 2022 in International Application No. PCT/US2022/035283.

*Primary Examiner* — Brandon Hoffman
*Assistant Examiner* — Samuel Ambaye
(74) *Attorney, Agent, or Firm* — Foley & Lardner LLP

(57) ABSTRACT

An illustrative embodiment disclosed herein is a non-transitory computer readable medium. In some aspects, the non-transitory computer readable medium includes instructions for providing a mobile user monitoring solution that, when executed by a processor, cause the processor to capture a transaction transmitted over an N12 interface, extract, from the transaction, one of an expected response (XRES) or an authentication token (AUTN), a user identifier (ID), and a cipher key, capture a first message transmitted over an N1 interface, and determine that the first message is associated with the user ID and the cipher key extracted from the transaction.

20 Claims, 8 Drawing Sheets

(51) Int. Cl.
*H04W 12/69* (2021.01)
*H04W 12/0431* (2021.01)
*H04W 12/03* (2021.01)

(58) Field of Classification Search
USPC .............................................. 726/2
See application file for complete search history.

(56) References Cited

U.S. PATENT DOCUMENTS

| | | | | |
|---|---|---|---|---|
| 2018/0302809 | A1* | 10/2018 | Liubinskas | H04W 12/033 |
| 2019/0174449 | A1* | 6/2019 | Shan | H04W 60/00 |
| 2022/0116770 | A1* | 4/2022 | Li | H04W 12/06 |
| 2022/0132315 | A1* | 4/2022 | Kolekar | H04L 63/205 |
| 2022/0141662 | A1* | 5/2022 | Liao | H04L 63/10 |
| | | | | 726/1 |
| 2022/0167244 | A1* | 5/2022 | Zaus | H04W 36/08 |

FOREIGN PATENT DOCUMENTS

| | | | |
|---|---|---|---|
| EP | 2469752 | A1 | 6/2012 |
| EP | 3393101 | A1 | 10/2018 |

* cited by examiner

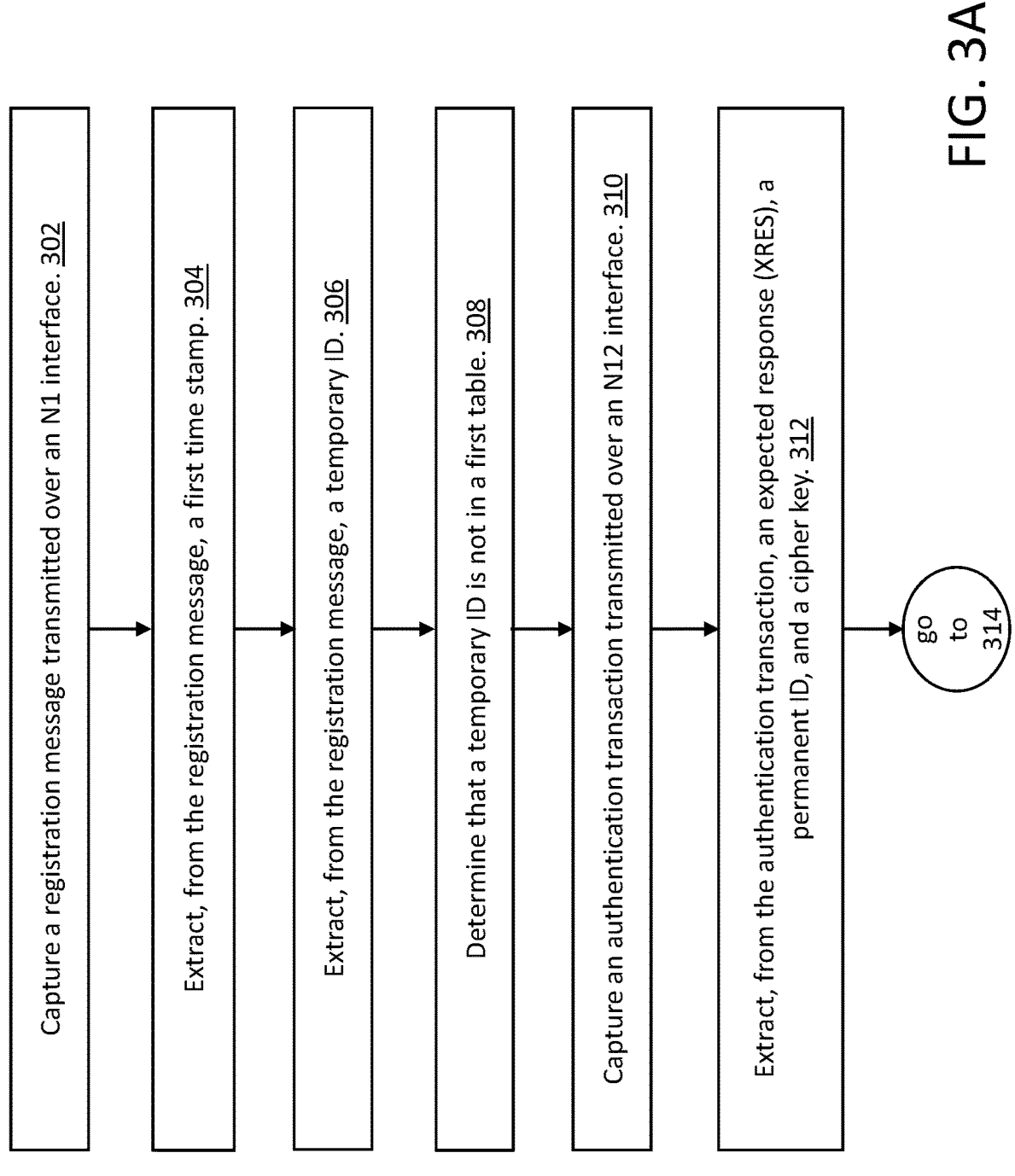

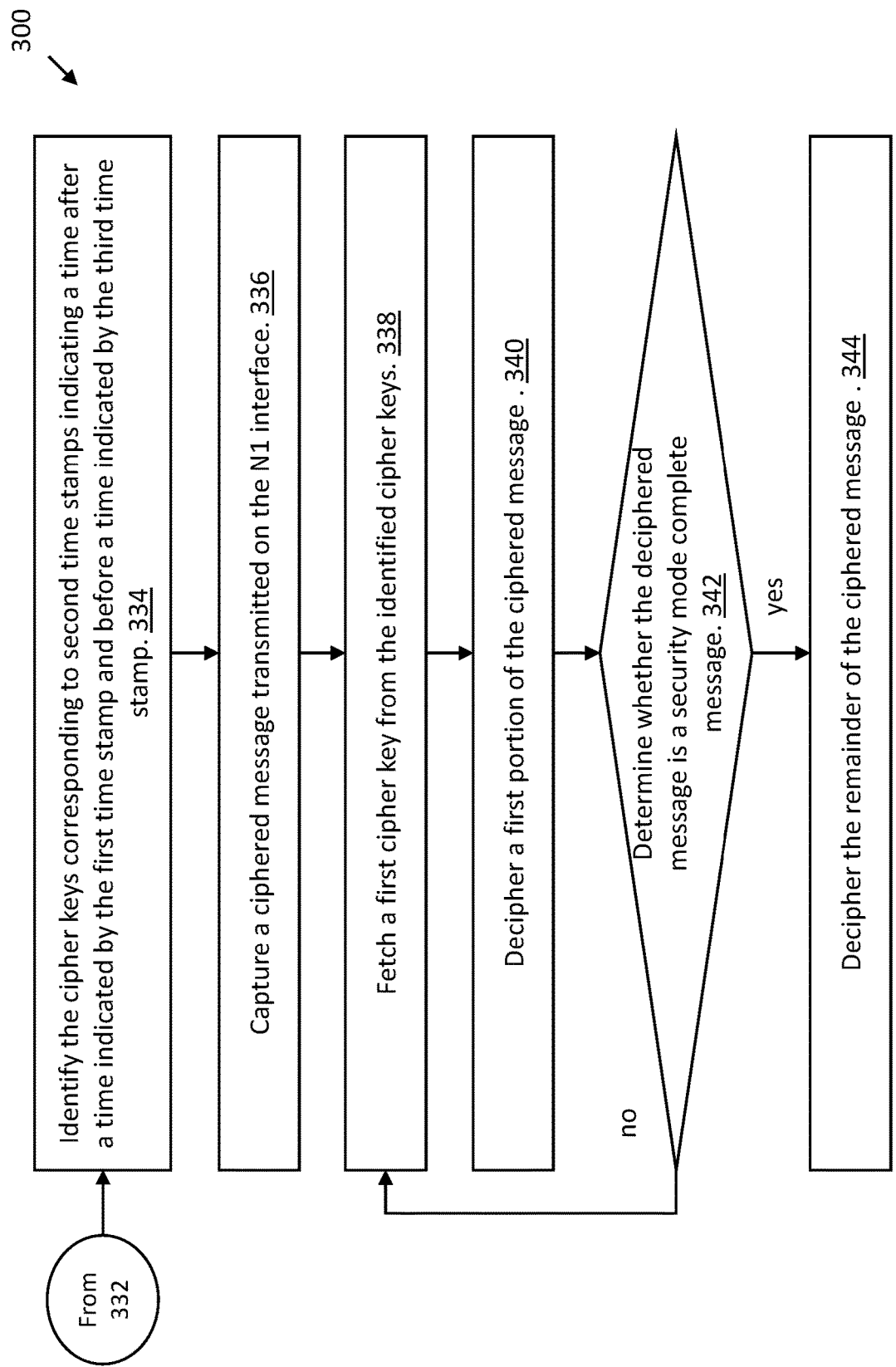

# 5G NAS DECIPHERING ENHANCE RATE OF CONVERGENCE MECHANISM

CROSS-REFERENCE TO RELATED APPLICATION

This application is related to and claims priority under 35 U.S. § 119(b) the Indian Patent Application No. 202141029412, filed Jun. 30, 2021, titled "5G NAS DECIPHERING ENHANCE RATE OF CONVERGENCE MECHANISM," the entire contents of which are incorporated herein by reference for all purposes.

BACKGROUND

The 5G Core aggregates data traffic from end devices. The 5G Core also authenticates subscribers and devices, applies personalized policies and manages the mobility of the devices before routing the traffic to operator services or the Internet. The 5G Core and its predecessor, the Evolved Core Packet (EPC), are different in that the 5G Core is decomposed into a number of Service-Based Architecture (SBA) elements and is designed from the ground-up for complete control and user plane separation. Rather than physical network elements, the 5G Core comprises software-based network functions.

SUMMARY

Aspects of the present disclosure relate generally to a 5G network, and more particularly to a system, apparatus, and method for monitoring N1 and N2 interfaces.

An illustrative embodiment disclosed herein is a non-transitory computer readable medium. In some aspects, the non-transitory computer readable medium includes instructions for providing a mobile user monitoring solution that, when executed by a processor, cause the processor to capture a transaction transmitted over an N12 interface, extract, from the transaction, one of an expected response (XRES) or an authentication token (AUTN), a user identifier (ID), and a cipher key, capture a first message transmitted over an N1 interface, and determine that the first message is associated with the user ID and the cipher key extracted from the transaction.

In some aspects, the medium includes instructions that, when executed by a processor, further cause the processor to extract, from the first message, a second one of the XRES or the AUTN that matches the one of the XRES or the AUTN and retrieve, from the storage medium, the cipher key and the user ID using the second one of the XRES or the AUTN.

In some aspects, the medium includes instructions that, when executed by a processor, further cause the processor to extract, from the first message, a second one of the XRES or the AUTN that matches the one of the XRES or the AUTN, and retrieve, from the storage, the cipher key and the user ID using the second one of the XRES or the AUTN.

In some aspects, the medium includes instructions that, when executed by a processor, further cause the processor to extract, from a second message transmitted over the N1 interface, a first time that the second message is transmitted and extract, from a third message transmitted over the N1 interface, a second time that the third message is transmitted, wherein the transaction is transmitted at a time between the first time and the second time.

In some aspects, the medium includes instructions that, when executed by a processor, further cause the processor to capture a fourth message, determine that the fourth message is ciphered, and decipher the fourth message using the cipher key.

In some aspects, the medium includes instructions that, when executed by a processor, further cause the processor to extract a plurality of cipher keys from a plurality of transaction that are transmitted at the time between the first time and the second time and cycle through each of the plurality of cipher keys, attempting to decipher the fourth message with a current one of the plurality of cipher keys, until successfully deciphering the fourth message using the current one of the plurality of cipher keys.

In some aspects, the transaction is an authentication request and an authentication response, the first message is an authentication message, the second message is a registration message, the third message is a security mode command message, and the fourth message is another message transmitted subsequent to the security mode command message being transmitted.

In some aspects, the medium includes instructions that, when executed by a processor, further cause the processor to capture a subsequent message transmitted over the N1 interface, decipher the subsequent message using the cipher key, extract session details from the subsequent message, and store the session details in a storage medium.

An illustrative embodiment disclosed herein is a non-transitory computer readable medium. In some aspects, the apparatus includes a processor and a memory. In some aspects, the memory includes programmed instructions that, when executed by the processor, cause the apparatus to capture a transaction transmitted over an N12 interface, extract, from the transaction, one of an expected response (XRES) or an authentication token (AUTN), a user identifier (ID), and a cipher key, capture a first message transmitted over an N1 interface, and determine that the first message is associated with the user ID and the cipher key extracted from the transaction.

In some aspects, the memory includes programmed instructions that, when executed by a processor, further cause the apparatus to store the one of the XRES or the AUTN, the user ID, and the cipher key in a storage medium.

In some aspects, the memory includes programmed instructions that, when executed by a processor, further cause the apparatus to: extract, from the first message, a second one of the XRES or the AUTN that matches the one of the XRES or the AUTN and retrieve, from the storage medium, the cipher key and the user ID using the second one of the XRES or the AUTN.

In some aspects, the memory includes programmed instructions that, when executed by a processor, further cause the apparatus to: extract, from a second message transmitted over the N1 interface, a first time that the second message is transmitted and extract, from a third message transmitted over the N1 interface, a second time that the third message is transmitted, wherein the transaction is transmitted at a time between the first time and the second time.

In some aspects, the memory includes programmed instructions that, when executed by a processor, further cause the apparatus to: capture a fourth message, determine that the fourth message is ciphered, and decipher the fourth message using the cipher key.

In some aspects, the memory includes programmed instructions that, when executed by a processor, further cause the apparatus to: extract a plurality of cipher keys from a plurality of transaction that are transmitted at the time between the first time and the second time and cycle through each of the plurality of cipher keys, attempting to decipher the fourth message with a current one of the plurality of cipher keys, until successfully deciphering the fourth message using the current one of the plurality of cipher keys.

In some aspects, the transaction is an authentication request and an authentication response, the first message is an authentication message, the second message is a registration message, the third message is a security mode command message, and the fourth message is another message transmitted subsequent to the security mode command message being transmitted.

In some aspects, the memory includes programmed instructions that, when executed by a processor, further cause the apparatus to: capture a subsequent message transmitted over the N1 interface, decipher the subsequent message using the cipher key, extract session details from the subsequent message, and store the session details in a storage medium.

An illustrative embodiment disclosed herein is a method. In some aspects, the method includes capturing a transaction transmitted over an N12 interface, extracting, from the transaction, one of an expected response (XRES) or an authentication token (AUTN), a user identifier (ID), and a cipher key, capturing a first message transmitted over an N1 interface, and determining that the first message is associated with the user ID and the cipher key extracted from the transaction.

In some aspects, the method includes storing the one of the XRES or the AUTN, the user ID, and the cipher key in a storage medium.

In some aspects, the method includes extracting, from the first message, a second one of the XRES or the AUTN that matches the one of the XRES or the AUTN and retrieving, from the storage medium, the cipher key and the user ID using the second one of the XRES or the AUTN.

In some aspects, the method includes extracting, from a second message transmitted over the N1 interface, a first time that the second message is transmitted and extracting, from a third message transmitted over the N1 interface, a second time that the third message is transmitted, wherein the transaction is transmitted at a time between the first time and the second time.

Further details of aspects, objects, and advantages of the disclosure are described below in the detailed description, drawings, and claims. Both the foregoing general description and the following detailed description are exemplary and explanatory and are not intended to be limiting as to the scope of the disclosure. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 3A-3D are a flow chart of an example method for monitoring the 5G network, in accordance with some embodiments.

Figure 1:
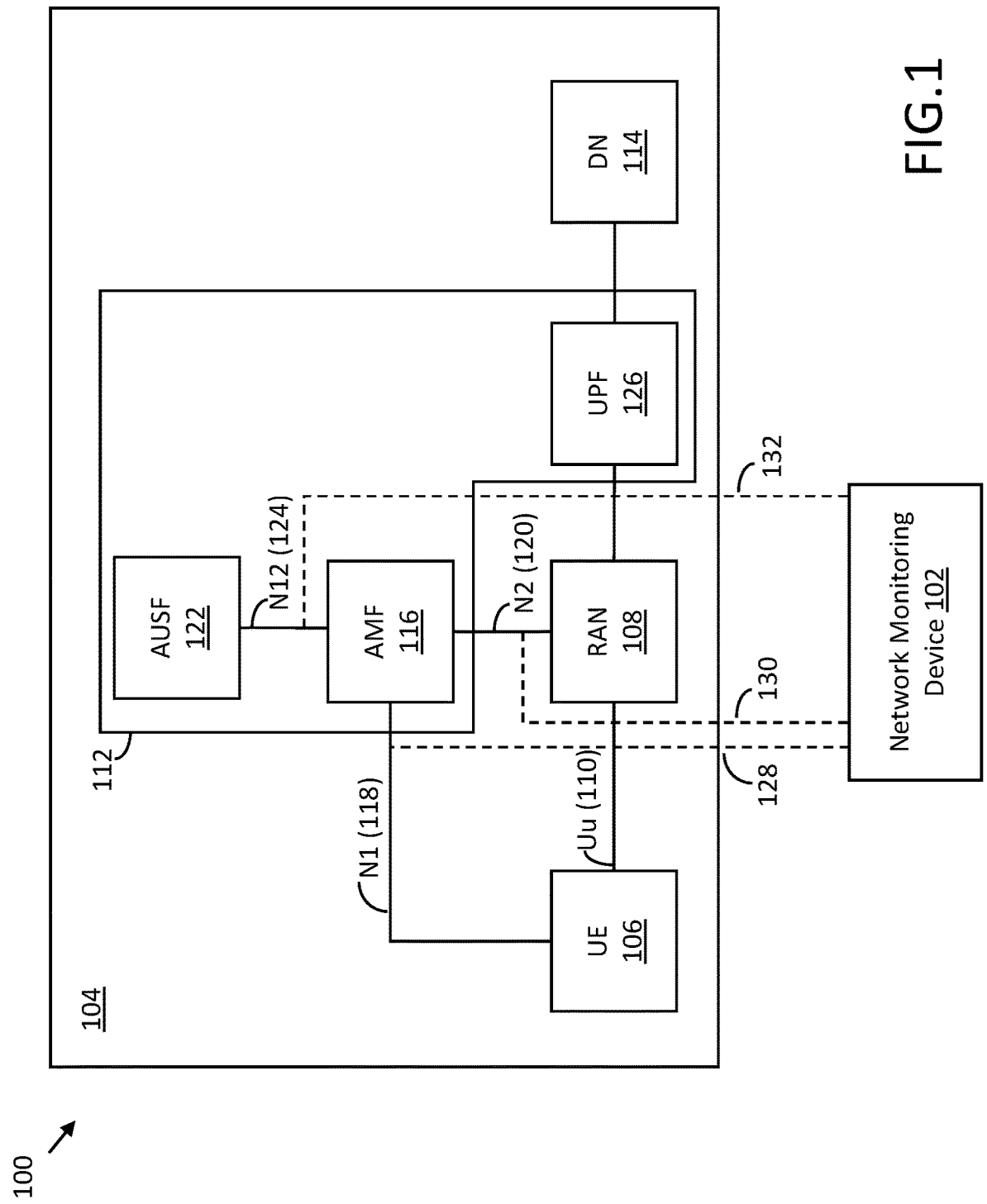
FIG. 1 is a block diagram of an environment for monitoring a 5G network, in accordance with some embodiments.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Tracking a user may include obtaining cipher keys for deciphering the user's messages as well as establishing mappings between temporary and permanent user identities that exist for the user within the 5G network. There are various challenges to obtaining the mappings and obtaining the cipher keys when monitoring the N1 interface (a 5G interface between the user and a core network, which is also known as the non-access stratum (NAS)) and the N2 interface (a 5G interface between a radio access network and the core network). In some embodiments, the mapping between the permanent user identity and the temporary user identities is unavailable. For example, an initial mapping between temporary to permanent user identifier (ID) message negotiation may be transmitted on the network very infrequently. It may take days, weeks, or months before this initial negotiation occurs. In some embodiments, there can be a disruption in the network feed or monitoring system which may break the mapping between the temporary user ID and the permanent user ID. In some embodiments, the authentication messages to negotiate the cipher keys by the NAS may themselves be ciphered, and keys for deciphering the ciphered authentication messages may be unavailable or unknown.

Disclosed herein is a system, apparatus, and method that extract user information from messages transmitted over the N12 interface, capture user traffic transmitted over the N1/N2 interface, and determine that the user traffic of the message transmitted over the N1/N2 interface is associated with the user information from the messages on the N12 interface. In some embodiments, the system, apparatus, and method associate a correct cipher key for deciphering ciphered user traffic by mapping user information extracted from a message transmitted over the N1 interface to the cipher key stored in a correlation table. In some embodiments, the system, apparatus, and method associate a correct cipher key for deciphering ciphered user traffic by cycling through cached cipher keys until the user traffic is successfully deciphered.

In some embodiments, the disclosure herein reduces a time of deciphering to a matter of hours or days instead of weeks or months. In addition, some embodiments of the disclosure minimize a number of times to actually run a deciphering algorithm, thereby reducing a central processing unit (CPU) consumption when trying to find the keys. Some embodiments of the disclosure speed up correlation of user data over the N1/N2 interface by allowing the NAS message to be deciphered quickly.

Referring now to FIG. 1, a block diagram of an environment 100 for monitoring a 5G network is depicted, in accordance with some embodiments. The environment 100 includes a network monitoring device (e.g., a probe) 102 coupled to a 5G (New Radio) network 104. The network monitoring device 102 captures traffic (e.g., messages, packets) transmitted on various interfaces of the 5G network 104, deciphers traffic, extracts user data from the traffic, self-correlates user data, and correlates user data to subsequent traffic transmitted by the user over various interfaces.

The 5G network 104 includes user equipment (UE) 106 such as a mobile device, a phone, a smart phone, an Internet of Things (IoT) device, a vehicular communications device, a computer, a laptop, a tablet, a smart watch, or any 3GPP device associated with a user. The 5G network 104 includes a radio access network (RAN) 108 that is in communication with the UE 106 via a Uu (air, wireless, etc.) interface 110. The RAN 108 covers a geographical area which is divided into cell areas, with each cell area being served by a base station (e.g., a cell tower, a Next Generation nodeB (gNB), etc.).

The 5G network 104 includes a core network (CN, e.g., a 5G core network) 112, which provides access to one or more data networks (DN) such as the DN 114. The CN 112 includes a service-based architecture (SBA) in which messaging/signaling between network functions (NFs) are exposed via (e.g., happen on top of) hypertext transfer protocol (HTTP)/2 representational state transfer (REST)-ful application program interface (API). Each of the components of the CN 112, and other components of the 5G network 104, can produce and/or consume NF services over the HTTP/2 transport. In some embodiments, container orchestrators (e.g., Docker Containers, Kubernetes) and microservices are employed in implementing the NFs. The CN 112 includes a user plane function (UPF) 126 that forwards messages from the RAN 108 to one or more data networks (DN) such as the DN 114 (e.g., the Internet, a Local Area Data Network, an Internet Protocol Multimedia Subsystem (IMS) network, etc.).

The CN 112 includes the access and mobility management function (AMF) 114, which manages access and of the UE 106. The AMF 116 is responsible for coordinating authentication and registering users to the network. The AMF 116 also manages mobility of the UE 106 when the UE 106 roams from one gNB to another for session continuity. The AMF 116 is in communication with the UE 106 via an N1 interface 118. The AMF 116 is in communication with the RAN 108 via an N2 interface 120. FIG. 1 shows the interfaces as logical interfaces. In particular, the N1 interface 106 is part of the non-access stratum (NAS) which is a highest functional layer in a protocol stack between the CN 112 and the UE 106. Although most of the logical interfaces are same as their physical counterparts, messages transmitted over the N1 interface are physically transmitted via the RAN 108.

The CN 112 includes the authentication server function (AUSF) 122 in communication with the AMF 116 over the N12 interface 124. The AUSF 122 is a part of the authentication procedure for authenticating the UE 106. The AUSF 122 sends a challenge message to the UE 106. The AUSF 122 verifies the authentication by comparing a response of the challenge message by the UE 106 to an expected response.

The UE 106 registers and authenticates after the UE 106 transitions from an idle state. First, the UE 106 sends a registration (e.g., initial NAS) message to the AMF 116. The registration message can include information elements (IEs) including IEs needed to establish security in the initial message when the UE 106 has no NAS security context. The registration message can include one or more temporary identifiers (IDs) such as a temporary mobile subscriber identity (TMSI), a shorten(S)-TMSI, a 5G-S-TMSI, a globally unique temporary ID (GUTI), or a 5G-GUTI. The registration message can include one or more concealed identifiers such as a subscription concealed ID (SUCI). The registration message is not ciphered.

Next, if the AMF 116 is not able to find the security context locally or from a last visited AMF (e.g., an AMF from another CN), or if the integrity check fails, then the AMF 116 initiates an authentication procedure with the UE 106. During the authentication procedure, in some embodiments, the AUSF 122 sends authentication vectors (AVs) to the AMF 116. The AVs may include an authentication token (AUTN), an expected response (XRES), and one or more cipher keys (e.g., CK, $K_{amf}$, $K_{seaf}$, $K_{ausf}$) for deciphering ciphered messages. In some embodiments, the AUSF 122 sends, to the AMF 116, one or more permanent IDs such as one or more of a subscription permanent identifier (SUPI), an international mobile subscriber identity (IMSI), an international mobile equipment identity (IMEI), an IMEI software version (IMEISV), or a network access identity (NAI). In some embodiments, the SUPI includes one or more of the IMSI, the IMEI, the IMEISV, or the NAI.

The AUSF 122 sends a challenge message to the UE 106 via the AMF 116. The UE 106 generates a response (RES) to the challenge message using a key derivation function (KDF) possessed by the UE 106. The UE 106 sends the RES to the AUSF 122 via the AMF 116. The AUSF 122 authenticates the UE 106 by comparing the RES to the XRES to determine if the RES and the XRES match. In some embodiments, the messages sent during the authentication procedure between the UE 106 and the AMF 116 (herein, the authentication messages or the N1 authentication messages) are not ciphered, while in other embodiments, the N1 authentication messages are ciphered. The N12 authentication messages are not ciphered.

Next, if the authentication is successful (e.g., XRES and the RES match), the AMF 116 sends the NAS security mode command message, which is not ciphered, to the UE 106. Next, the UE 106 shall send the NAS security mode complete message to the AMF 116 in response to the NAS Security Mode Command message. The NAS security mode complete is ciphered and integrity protected.

The network monitoring device 102 is connected to the 5G network 104 using various links. For example, the network monitoring device 102 is coupled to the N1 interface 118 via link 128, the N2 interface 120 via link 130, and the N12 interface 124 via link 132. In some embodiments, the network monitoring device 102 is coupled to other interfaces (e.g., the Uu interface 110) via other links. Each of the links can be passive or active and include software, firmware, and/or hardware components, such as taps, probes, or port mirrors that can be positioned in-line along communication links between various components of the 5G network 104. In the case of a physical site, each link can receive a copy of packets flowing over the respective interface from a tap in-line with an edge router located at the physical site, or from a switch port analyzer ("SPAN") port on the edge router.

Figure 2A:
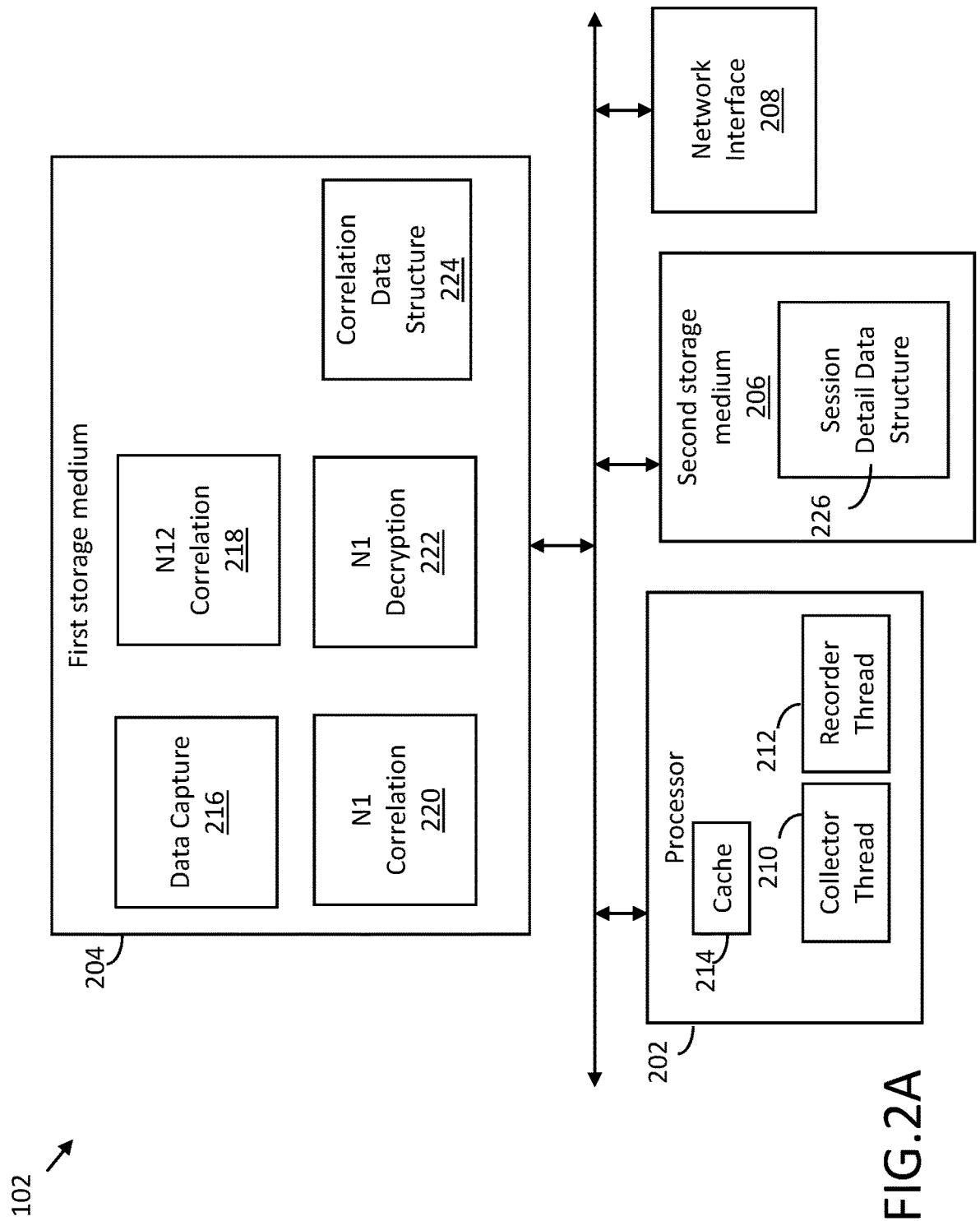
FIG. 2A is a block diagram of the network monitoring device, in accordance with some embodiments.

Referring now to FIG. 2A, a block diagram of the network monitoring device 102 is depicted, in accordance with some embodiments. The network monitoring device 102 includes a processor 202, a first storage medium 204, a second storage medium 206, and a network interface 208. The network monitoring device 102 may include other components such as input devices (e.g., keyboard, mouse) and output devices (e.g., display, monitor).

The processor 202 executes computer instructions stored in one or more of the first storage medium 204 or the second storage medium 206. Although only a single processor is shown in FIG. 2A, any number of processors is within the scope of the present disclosure. The processor 202 includes a cache 214. In some embodiments, user data extracted from captured traffic data can be stored in the cache 214.

The processor 202 includes one or more threads. For example, as shown in FIG. 2A, the processor includes a collector thread 210 and a recorder thread 212. In some embodiments, the collector thread 210 performs at least one of collecting user/session details/data/metadata (e.g., location information, a handset type, local network information, or service quality information) extracted from messages (e.g., N1 or N2 messages) transmitted over various (e.g., N1 or N2) interfaces, storing the session details in the cache 214 or the first storage medium 204, or aggregating statistics on the session details. In some embodiments, the recorder thread 212 stores, or copies, one or more of the messages or the session details to the second storage medium 206. Advantageously, by processing various messages in parallel in separate (e.g., dedicated) threads, the monitoring device 102 can achieve lower latency and live-time, or substantially live-time, monitoring of the 5G network 104. Although the processor 202 is shown as having one core and two threads, the processor 202 can have any number of cores and threads and remain within the scope of the present disclosure.

The first storage medium 204 stores instructions (e.g., computer instructions, programmed instructions) for one or more of processing, extracting, correlating, generating, storing, or retrieving traffic data (e.g., messages, packets, headers, payloads, fields, information elements, parameters, keys, etc.) or metadata derived from the traffic data. The first storage medium 204 is implemented in one of various devices (e.g., Random-Access Memory (RAM), static RAM (SRAM), dynamic RAM (DRAM), Resistive RAM (ReRAM), magnetoresistive RAM (MRAM)) that has a faster read or write speed than the second storage medium 206.

In some embodiments, the first storage medium 204 includes instructions for data capture 216, N12 correlation 218, N1 correlation 220, and N1 decryption 222. In some embodiments, one or more of the instructions 216-222 can be combined. In some embodiments, the data capture 216 instructions include instructions to capture messages (e.g., control packets or data packets). In some embodiments, the data capture 216 instructions include instructions to extract user data (e.g., temporary IDs, permanent IDs, cipher keys, time stamps, any parameters or state information related to user data) from the captured messages. For example, the data capture 216 instructions include instructions to extract one or more of security parameters such as XRES or AUTN, a permanent ID, or security context (e.g., one or more cipher keys, key set identifier, uplink and downlink NAS count, etc.) from authentication messages transmitted over the N12 interface. In some embodiments, the data capture 216 instructions include instructions to extract one or more of a time stamp or a temporary ID from a registration message transmitted over the N1 interface and a second time stamp from a security mode command message transmitted over the N1 interface. In another example, the data capture 216 instructions include instructions to extract one or more of the session details associated with the user (e.g., handset type, etc.) from messages transmitted over one or more of the N1 interface or the N2 interface. The data capture 216 instructions can include instructions for software agents or virtual devices that remotely operate on, or control, each of the links (e.g., links 128, 130, and 132) and/or any associated hardware.

In some embodiments, the N12 correlation 218 instructions include instructions to correlate/map/link any user data extracted from messages captured over the N12 interface 124. For example, the N12 correlation 218 instructions include instructions to correlate an XRES to a permanent ID. In some embodiments, correlating includes storing the first parameter in a first field of a record associated with a user (e.g., an NGAP record or a user database record) and storing the second parameter in a second field of the record associated with the user. This may be referred to as generating a mapping from the first parameter to the second parameter. For example, the N12 correlation 218 instructions include instructions to store (e.g., populate) the XRES extracted from an N12 message in a first field of an XRES record and to store the permanent ID extracted from the N12 message in a second field of the XRES record. Similarly, in some embodiments, the N12 correlation 218 instructions include instructions to store the extracted permanent ID in a first field of a user database record and to store one or more cipher keys extracted from the N12 message in a second field of the user database record. In some embodiments, each mapping may be a key-value pair in which the first parameter (the XRES or the permanent ID) is a key and the second parameter (the permanent ID or the one or more cipher keys, respectively) is the value. In some embodiments, the first parameter is an input to a hash function which generates or fetches (e.g., retrieves) the second parameter or a location/address of the second parameter.

In some embodiments, the N1 correlation 220 instructions include instructions to correlate any user data extracted from messages captured over the N1 interface 118. For example, the N1 correlation 220 instructions include instructions to use a second XRES extracted from an authentication message transmitted over the N1 interface to retrieve, from the correlation data structure 224, a permanent ID stored in the correlation data structure 224. In some embodiments, the second XRES matches the XRES that the permanent ID was correlated with (e.g., mapped to). For instance, the N1 correlation 220 instructions include instructions to apply the hash function to the second XRES to retrieve the permanent ID. Once the permanent ID is retrieved, the N1 correlation 220 instructions include instructions to use the permanent ID (e.g., apply the hash function to the permanent ID) to retrieve, from the correlation data structure 224, the one or more cipher keys that was previously mapped to the permanent ID.

In some embodiments, the N1 correlation 220 instructions include instructions to correlate a temporary ID to a permanent ID and cipher keys to generate a mapping from the temporary ID to the permanent ID and the cipher keys. The N1 correlation 220 instructions include instructions to store the temporary ID-to-permanent ID mapping in the correlation data structure 224. In some embodiments, the N1 correlation 220 instructions include instructions to use the temporary ID (or a second temporary ID extracted from another message and matching the temporary ID) to retrieve, from the correlation data structure 224, the permanent ID and the cipher keys that were previously mapped to the temporary ID. One or more of the instructions of the N1 correlation 220 instructions may be interchangeable with one or more of the instructions of the N12 correlation 218 instructions.

In some embodiments, the N1 correlation 218 instructions include instructions to store session details such as handset type in a session detail data structure, which may be stored in a storage medium separate from the storage medium where the correlation data structure 224 is stored. In some embodiments, a session detail record in the separate session detail data structure can be linked to a respective user database record in the correlation data structure 224, for example, with an IMEI or an IMSI.

In some embodiments, the N1 decryption 222 instructions include instructions to decipher a ciphered N1 message (e.g., a ciphered N1 authentication message, a ciphered N1 security mode complete message, a subsequent N1 ciphered message) using a cipher key. In some embodiments, the ciphered N1 message includes security-related IEs (e.g., an unciphered security header, a temporary ID, a permanent ID, an XRES, etc.) that is used to retrieve the one or more cipher keys that deciphers the ciphered N1 message. In some embodiments, a plurality of cipher keys are provided for deciphering and the N1 decryption 222 instructions include instructions to iteratively select one of the cipher keys to decipher the ciphered N1 message until the N1 message is successfully deciphered.

In some embodiments, the N1 decryption 222 instructions include instructions to determine whether traffic data is ciphered. For example, security state information may be extracted from a message or a separate message that may indicate whether the message is ciphered. The N1 decryption 222 instructions may include instructions to decipher a message if the extracted security state information indicates that the message is ciphered.

The first storage medium 204 includes the correlation data structure 224, which stores the mappings in one or more data structures (e.g., databases, tables, files). For example, a first table stores a mapping of XRES-permanent ID pairs, a second table stores a mapping of temporary ID-permanent ID and cipher keys tuples. Each table can include a number of records (e.g., rows). In some embodiments, each record has a first field (e.g., entry) populated by the first parameter (e.g., information element) of the mapping, or a hash thereof, and each of the one or more second fields populated by the second parameter (e.g., one of the second parameters, if there is more than one) of the mapping, or a hash thereof. In some embodiments, the table is a hash table (e.g., a key-value table) in which the record containing the one or more second fields (e.g., the values, values in a bucket, etc.) is determined, fetched, or located based on transforming the first parameter by a hashing function (e.g., modulus of a predetermined number).

The second storage medium 206 stores data or metadata that is the result of processing or correlating the traffic data. The second storage medium 206 is implemented in one of various devices (e.g., solid-state drive, hard disk drive, optical drive, etc.) that can store a greater amount of data than the first storage medium 204. In some embodiments, the second storage medium 206 stores the instructions for the data capture 216, the N12 correlation 218, the N1 correlation 220, and the N1 decryption 222, or instances thereof. In some embodiments, the processor 202 can execute each of the instructions 216, 218, 220, and 222 from the second storage medium 206. In some embodiments, the second storage medium 206 stores copies of the correlation data structures 224.

In some embodiments, the second storage medium 206 includes the session detail data structure 226. The session detail data structure 226 includes session details (e.g., location information, a handset type, local network information, or service quality information) extracted from the captured messages. In some embodiments, session details (e.g., location information, a handset type, local network information, or service quality information) for each user are in a respective session detail record. In some embodiments, a user's session detail record persists even after the user has changed temporary IDs. In some embodiments, the second storage medium 206 stores the captured messages, monitoring-related user parameters (e.g., temporary ID) extracted from the captured messages, etc.

Figure 2B:
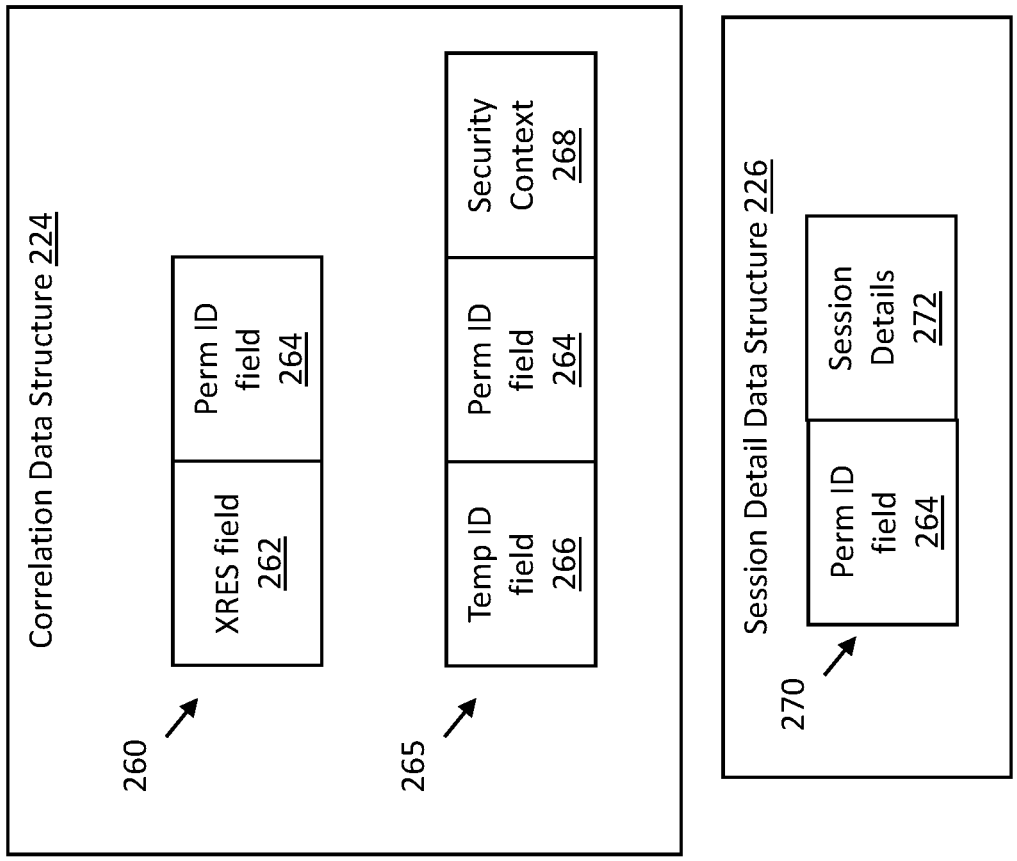
FIG. 2B is a block diagram of records of one user that are in the correlation data structure and the session detail data structure, in accordance with some embodiments.

FIG. 2B illustrates records of one user that are in the correlation data structure 224 and the session detail data structure 226, in accordance with some embodiments of the present disclosure. In some embodiments, the correlation data structure 224 includes an XRES record 260 and a user database record 265. In some embodiments, the XRES record 260 includes an XRES field 262 and a permanent ID field 264, and the user database record 265 includes a temporary ID field 266, the permanent ID field 264, and a security context (e.g., cipher key) field 268. In some embodiments, the session detail data structure 226 includes a session detail record 270. In some embodiments, the session detail record 270 includes a permanent ID field 264 and a session details field 272. In some embodiments, the session details field 272 includes multiple fields (e.g., at least one for handset type, at least one for local network information, at least one for location information, at least one for service quality information, etc.).

Returning to FIG. 2A, the network interface 208 may include a NIC (network interface card) or other standard network interfaces to receive captured network traffic and communicate with other network interface devices. For example, the network interfaces 208 may include an N1 interface (e.g., the link 128), an N2 interface (e.g., the link 130), an N12 interface (e.g., the link 132), a 802.11 interface, an Ethernet interface, or other wired or wireless network interfaces.

Referring now to FIGS. 3A-3D, a flow chart of an example method 300 for monitoring the 5G network 104 is depicted, in accordance with some embodiments. The method 300 can be performed by one or more systems, components, or modules depicted in FIG. 1 or 2, including, for example, a network monitoring device 102, the processor 202, etc. In some embodiments, instructions for performing the method 300 are stored in the first storage medium 204. Additional, fewer, or different operations may be performed in the method 300 depending on the embodiment. Additionally, or alternatively, two or more of the blocks of the method 300 may be performed in parallel.

Referring now to FIG. 3A, the processor 202 captures a registration message transmitted over the N1 interface 118 (at operation 302). The processor extracts, from the registration message, a first time stamp (at operation 304). The processor 202 extracts, from the registration message, a temporary ID (at operation 306). In some embodiments, the temporary ID includes a TMSI or a GUTI.

The processor 202 determines that the temporary ID is not in a first table (at operation 308). The first table may be a first correlation table (e.g., user database record 265). The first table may be a first correlation table that includes mappings of temporary IDs and respective permanent IDs and/or respective cipher keys.

The processor 202 captures an authentication transaction transmitted over the N12 interface 124 (at operation 310). In some embodiments, the authentication transactions includes a pair of authentication messages. In some embodiments, the authentication transaction includes an authentication request message and an authentication response message. The processor 202 extracts, from the authentication transaction, an expected response (XRES), a permanent ID, and a cipher key (at operation 312). For example, the processor 202 extracts the XRES and the permanent ID from the authentication request message and the cipher key from the authentication response message.

Figure 3B:
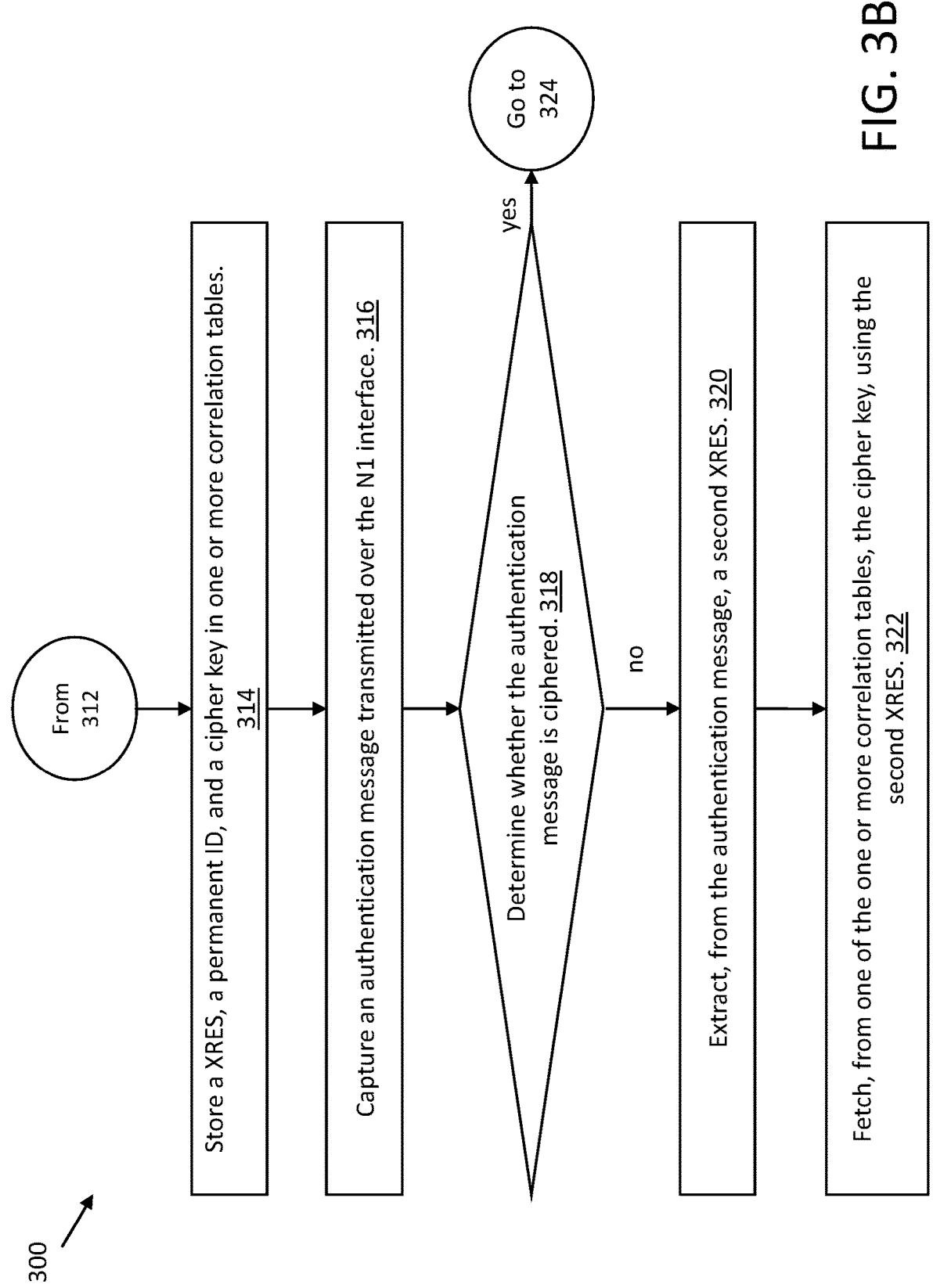

Referring now to FIG. 3B, the processor 202 stores the XRES, the permanent ID, and the cipher key in one or more correlation tables (at operation 314). For example, the XRES and the permanent ID can be stored as a record in a second correlation table (e.g., XRES record 260) and the permanent ID and the cipher key can be stored as a record in the first correlation table. In some embodiments, the XRES is stored as a first hash of the XRES and the permanent ID is stored as a hash of the permanent ID. In some embodiments, the permanent ID includes one or more of a Subscription Permanent Identifier (SUFI) or an International Mobile Subscriber Identity (IMSI). In some embodiments, the one or more correlation tables are stored in the first storage medium 204.

The processor captures an authentication message transmitted over the N1 interface 118 (at operation 316). The processor 202 determines whether the authentication message is ciphered (at operation 318). In some embodiments, the processor 202 extracts a ciphering state from an unciphered portion of the authentication message and processes the ciphering state to determine whether the authentication message is ciphered. For example, if the processor 202 determines that the ciphering state is a first state, the processor 202 determines that (at least some of) the authentication message is ciphered, whereas if the processor 202 determines that the ciphering state is a second state, the processor 202 determines that (the entirety of) the authentication message is unciphered.

In response to determining that the second authentication message is not ciphered, the processor 202 extracts, from the authentication message, a second XRES (at operation 320). In some embodiments, the second XRES matches the XRES extracted from the authentication message. The processor 202 fetches, from one of the one or more correlation tables, the cipher key, using the second XRES (at operation 322). For example, the processor 202 fetches the permanent ID that the XRES (and, therefore, the second XRES) is mapped to by looking up, in the second correlation table, a record containing the XRES and fetching the respective permanent ID from a field in the record in which the respective permanent ID is located. In some embodiments, looking up the record includes performing a hash of the second XRES. In some embodiments, the processor 202 fetches, in the first correlation table, the cipher key that the permanent ID is mapped to. The processor 202 may fetch the cipher key in a similar way to how the processor fetched the permanent ID.

Figure 3C:
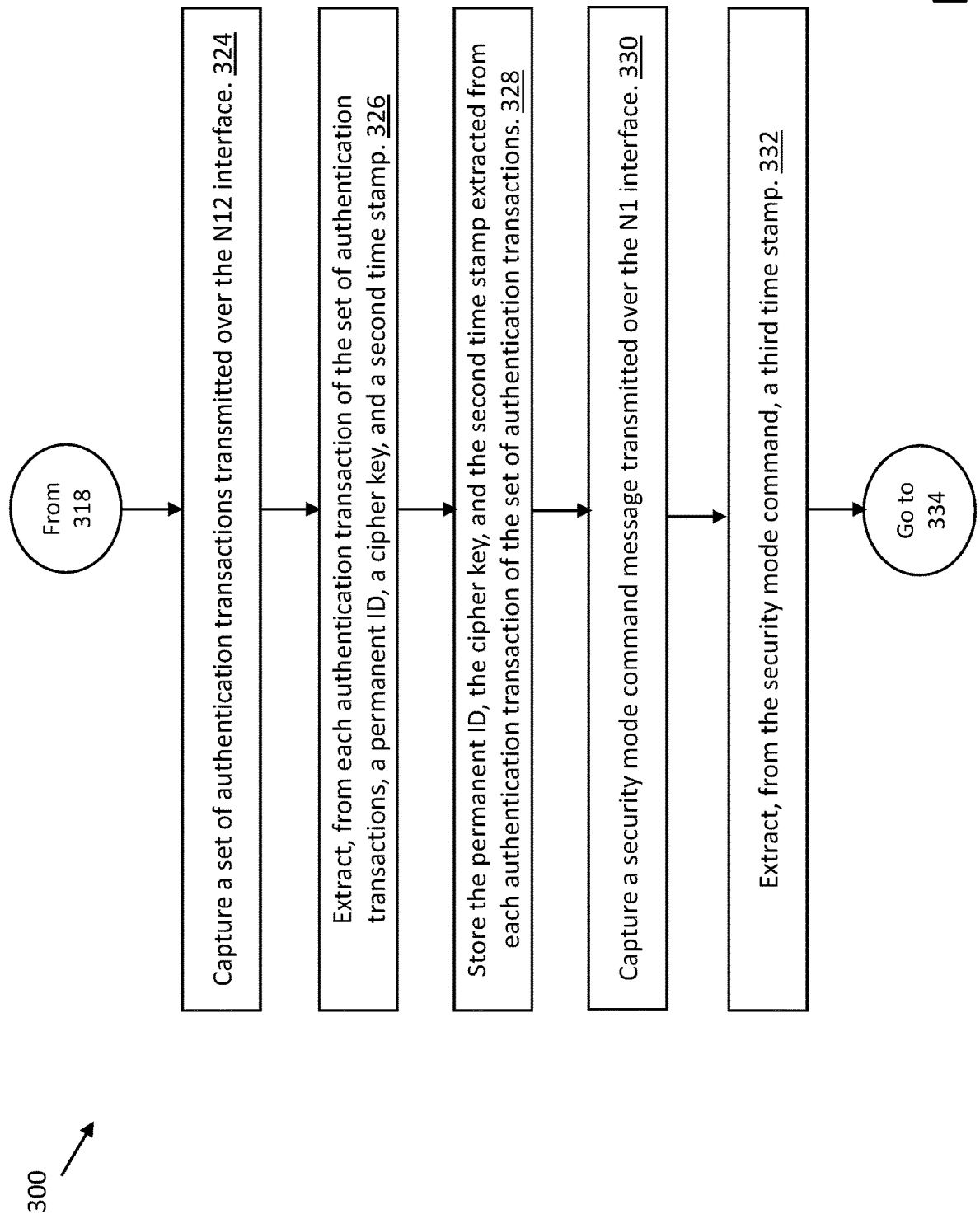

Referring now to FIG. 3C, in response to either determining that the authentication message is ciphered, the processor 202 captures a set of authentication transactions transmitted over the N2 interface (at operation 324). The processor 202 extracts, from each authentication transaction of the set of authentication transactions, a permanent ID, a cipher key, and a second time stamp (at operation 326). The processor 202 stores the permanent ID, the cipher key, and the second time stamp (e.g., for a predetermined time duration) extracted from each authentication transaction of the set of authentication transactions (at operation 328). For example, the permanent ID, the cipher key, and the second time stamp for each authentication transaction is stored in a separate record. In some embodiments, the processor 202 stores the cipher key in a queue such that the cipher key can later be retrieved in order of time stored. In some embodiments, the processor 202 caches the permanent ID and the cipher key in the cache 214. In some embodiments, after the predetermined time duration has passed, the processor 202 moves the cached items to one of the first storage medium 204 or the second storage medium 206, while in other embodiments, the processor 202 deletes the cached items.

The processor 202 captures a security mode command message transmitted over the N1 interface (at operation 330). The processor 202 extracts, from the security mode command message, a third time stamp (at operation 332). In some embodiments, the processor 202 identifies/determines, from a set of second time stamps corresponding to the set of authentication transactions, a subset of second time stamps indicating a first time after (e.g., greater than) a second time indicated by the first time stamp and before (e.g., less than) a third time indicated by the third time stamp.

Referring now to FIG. 3D, the processor 202 identifies/determines/selects/retains, from a set of cipher keys corresponding to the set of authentication transactions, a subset of cipher keys (e.g., and permanent IDs) corresponding to the subset of second time stamps (at operation 334). In some embodiments, each cipher key of the subset of cipher keys was extracted from an authentication transaction that was transmitted at a first time after the second time indicated by the first time stamp and before the third time indicated by the third time stamp.

The processor 202 captures a ciphered message transmitted on the N1 interface 118 (at operation 336). The ciphered message may be captured after the security mode command message is captured. In some embodiments, the ciphered message is a ciphered security mode complete message. In some embodiments, the ciphered message is another message (e.g., an identity message) that comes before the ciphered security mode complete message and that is ciphered. The processor 202 fetches a first cipher key from the subset of cipher keys (at operation 338). In some embodiments, once the first cipher key is fetched, it is deleted from the storage from which it is fetched (e.g., the queue).

The processor 202 deciphers (e.g., attempts to decipher) a first portion of the ciphered message (at operation 340). The processor 202 determines whether the deciphered message is a security mode complete message (at operation 342). In response to determining that the deciphered message is not a security mode complete message, the processor 202 returns to the operation 338. In response to determining that the deciphered message is a security mode complete message, the processor 202 deciphers the remainder of the ciphered message (at operation 344).

Upon completion of either operation 322 or operation 344, in some embodiments, the processor 202 can use the correlation tables to identify other (e.g., subsequent) NAS messages associated with the user. In some embodiments, the processor 202 fetches (e.g., retrieves) the cipher key to decipher the other ciphered NAS messages associated with the user. In some embodiments, the processor 202 extracts session details and stores user data associated with the user in the session detail record 270 associated with the user in the session detail data structure 226.

Figure 4:
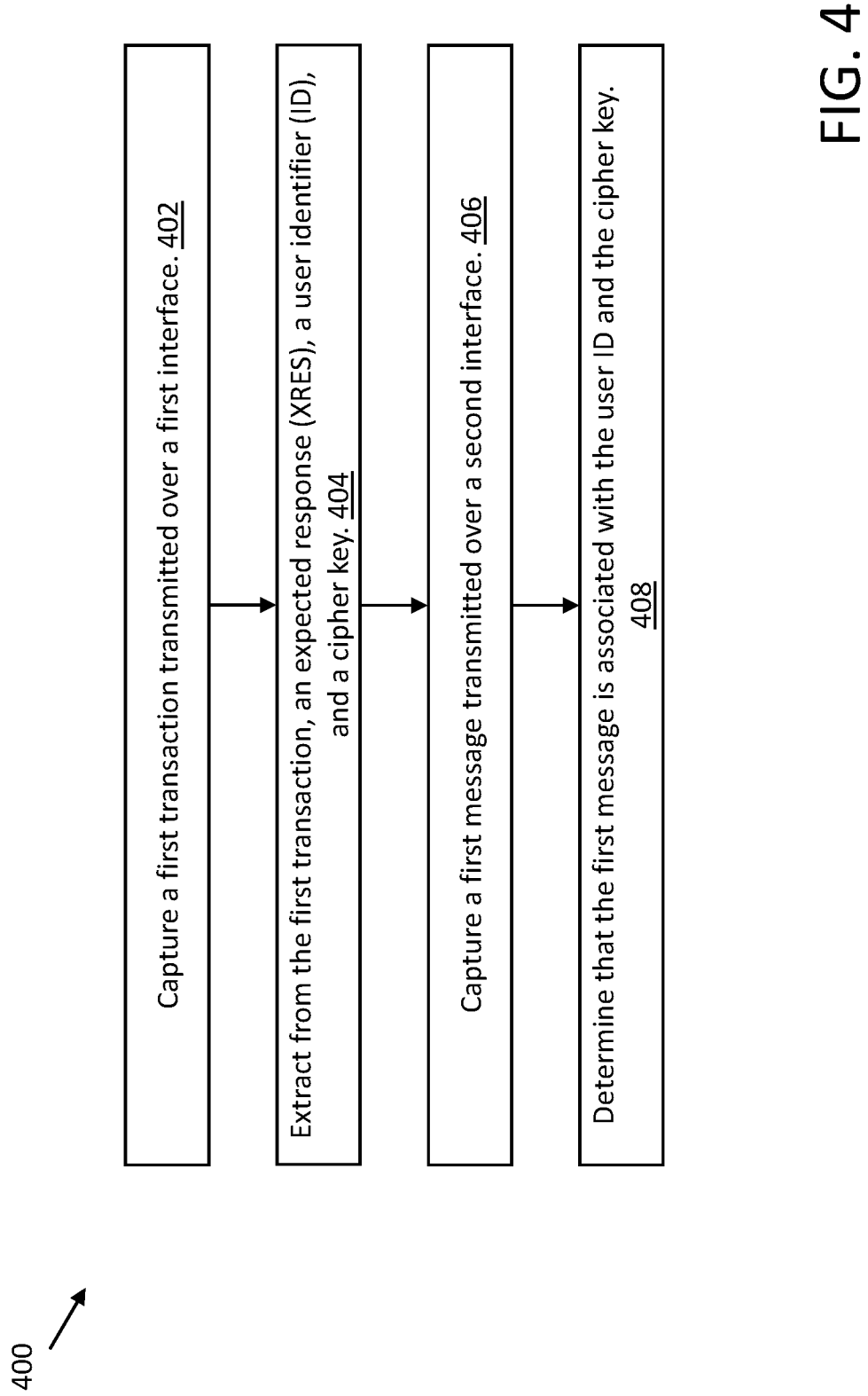
FIG. 4 is a flow chart of an example method for monitoring the 5G network, in accordance with some embodiments.

Referring now to FIG. 4, a flow chart of an example method 400 for monitoring the 5G network 104 is depicted, in accordance with some embodiments. The method 400 can be performed by one or more systems, components, or modules depicted in FIG. 1 or 2, including, for example, a network monitoring device 102, the processor 202, etc. Additional, fewer, or different operations may be performed in the method 400 depending on the embodiment. Additionally, or alternatively, two or more of the blocks of the method 400 may be performed in parallel. Operations of the method 400 can be combined with or interchanged with operations of the method 300.

The processor 202 captures a transaction (e.g., a pair of authentication messages, a authentication request and an authentication response, etc.) transmitted over a first interface (e.g., N12 interface) (operation 402). The processor 202 extracts from the transaction, a security parameter (e.g., one of an expected response (XRES), an authentication token (AUTN), or other security parameter), a user identifier (ID), and a cipher key (operation 404). The processor 202 captures a first message (e.g., authentication message) transmitted over a second interface (e.g., N1 interface) (operation 406). The processor 202 determines that the first message is associated with the user ID and the cipher key (operation 408). The method 400 may include additional implementations, such as any single implementation or any combination of implementations described below and/or in connection with one or more other methods described elsewhere herein.

In some implementations, the processor 202 correlates the XRES with the user ID to determine a first mapping between the XRES and the user ID, correlates the user ID with the cipher key to determine a second mapping between the user ID and the cipher key, and stores the first mapping and the second mapping in a storage. In some implementations, the processor 202 extracts, from the first message, a second XRES that matches the XRES and retrieves, from the storage, the cipher key and the user ID using the second XRES.

In some implementations, the processor 202 determines that the first message is ciphered. In some implementations, the processor 202 captures a second message (e.g., registration message) transmitted over the second interface and extracts, from the second message, a first time that the second message is transmitted. In some implementations, the processor 202 captures a third message (e.g., security mode command message) transmitted over the second interface and extracts, from the third message, a second time that the third message is transmitted, wherein the transaction is transmitted at a time between the first time and the second time. In some implementations, the processor 202 captures a fourth message (e.g., a security mode complete message or other message that is transmitted after the security mode command message) that is ciphered and that is transmitted over the second interface.

In some embodiments, the processor 202 captures a plurality of transactions that are transmitted at the time between the first time and the second time. In some embodiments, the processor 202 extract a plurality of cipher keys from the plurality of transactions. In some embodiments, the processor 202 cycles (e.g., iterates) through each cipher key of the plurality of cipher keys, attempting to decipher the fourth message with a current one of the plurality of cipher keys, until successfully deciphering the fourth message using the current one of the plurality of cipher keys.

In some implementations, the processor 202 captures a subsequent message transmitted over the second interface, and deciphers the subsequent message using the cipher key. In some embodiments, the processor 202 extracts session details from the subsequent message. In some embodiments, the processor 202 stores the session details in a storage medium.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed:

1. A non-transitory computer readable medium comprising instructions for providing a mobile user monitoring solution that, when executed by a processor, cause the processor to:
   capture a second message transmitted over an N1 interface in a 5G network;
   determine that a first user identifier (ID) of a first type of user ID in the second message does not correspond to a mapping in a stored table, the stored table comprising mappings between user IDs of the first type and (i) user IDs of a second type, or (ii) cipher keys;
   capture a transaction transmitted over an N12 interface in the 5G network;
   responsive to the determination, extract, from the transaction, (i) one of an expected response (XRES) or an authentication token (AUTN), (ii) a second user ID, and (iii) a cipher key;
   capture a first message transmitted over an N1 interface in the 5G network; and
   determine that the first message is associated with the user ID and the cipher key extracted from the transaction.

2. The medium of claim 1, comprising instructions that, when executed by a processor, further cause the processor to store the one of the XRES or the AUTN, the user ID, and the cipher key in a storage medium.

3. The medium of claim 2, comprising instructions that, when executed by a processor, further cause the processor to:
   extract, from the first message, a second one of the XRES or the AUTN that matches the one of the XRES or the AUTN; and
   retrieve, from the storage medium, the cipher key and the user ID using the second one of the XRES or the AUTN.

4. The medium of claim 1, comprising instructions that, when executed by a processor, further cause the processor to:
   extract, from the second message transmitted over the N1 interface, a first time that the second message is transmitted; and
   extract, from a third message transmitted over the N1 interface, a second time that the third message is transmitted, wherein the transaction is transmitted at a time between the first time and the second time.

5. The medium of claim 4, comprising instructions that, when executed by a processor, further cause the processor to:
   capture a fourth message;
   determine that the fourth message is ciphered; and
   decipher the fourth message using the cipher key.

6. The medium of claim 5, comprising instructions that, when executed by a processor, further cause the processor to:
   extract a plurality of cipher keys from a plurality of transaction that are transmitted at the time between the first time and the second time; and
   cycle through each of the plurality of cipher keys, attempting to decipher the fourth message with a current one of the plurality of cipher keys, until successfully deciphering the fourth message using the current one of the plurality of cipher keys.

7. The medium of claim 5, wherein the transaction is an authentication request and an authentication response, the first message is an authentication message, the second message is a registration message, the third message is a security mode command message, and the fourth message is another message transmitted subsequent to the security mode command message being transmitted.

8. The medium of claim 1, comprising instructions that, when executed by a processor, further cause the processor to:
   capture a subsequent message transmitted over the N1 interface;
   decipher the subsequent message using the cipher key;
   extract session details from the subsequent message; and
   store the session details in a storage medium.

9. An apparatus comprising a processor and a memory, wherein the memory includes programmed instructions that, when executed by the processor, cause the apparatus to
   capture a second message transmitted over an N1 interface in a 5G network;
   determine that a first user identifier (ID) of a first type of user ID in the second message does not correspond to a mapping in a stored table, the stored table comprising mappings between user IDs of the first type and (i) user IDs of a second type, or (ii) cipher keys;

capture a transaction transmitted over an N12 interface in the 5G network;

responsive to the determination, extract, from the transaction, (i) one of an expected response (XRES) or an authentication token (AUTN), (ii) a second user ID, and (iii) a cipher key;

capture a first message transmitted over an N1 interface in a 5G network; and determine that the first message is associated with the user ID and the cipher key extracted from the transaction.

10. The apparatus of claim 9, wherein the memory includes programmed instructions that, when executed by a processor, further cause the apparatus to store the one of the XRES or the AUTN, the user ID, and the cipher key in a storage medium.

11. The apparatus of claim 10, wherein the memory includes programmed instructions that, when executed by a processor, further cause the apparatus to:

extract, from the first message, a second one of the XRES or the AUTN that matches the one of the XRES or the AUTN; and retrieve, from the storage medium, the cipher key and the user ID using the second one of the XRES or the AUTN.

12. The apparatus of claim 9, wherein the memory includes programmed instructions that, when executed by a processor, further cause the apparatus to:

extract, from the second message transmitted over the N1 interface, a first time that the second message is transmitted; and extract, from a third message transmitted over the N1 interface, a second time that the third message is transmitted, wherein the transaction is transmitted at a time between the first time and the second time.

13. The apparatus of claim 12, wherein the memory includes programmed instructions that, when executed by a processor, further cause the apparatus to:

capture a fourth message;

determine that the fourth message is ciphered; and decipher the fourth message using the cipher key.

14. The apparatus of claim 13, wherein the memory includes programmed instructions that, when executed by a processor, further cause the apparatus to:

extract a plurality of cipher keys from a plurality of transaction that are transmitted at the time between the first time and the second time; and cycle through each of the plurality of cipher keys, attempting to decipher the fourth message with a current one of the plurality of cipher keys, until successfully deciphering the fourth message using the current one of the plurality of cipher keys.

15. The apparatus of claim 13, wherein the transaction is an authentication request and an authentication response, the first message is an authentication message, the second message is a registration message, the third message is a security mode command message, and the fourth message is another message transmitted subsequent to the security mode command message being transmitted.

16. The apparatus of claim 9, wherein the memory includes programmed instructions that, when executed by a processor, further cause the apparatus to:

capture a subsequent message transmitted over the N1 interface;

decipher the subsequent message using the cipher key;

extract session details from the subsequent message; and store the session details in a storage medium.

17. A method comprising:

capture a second message transmitted over an N1 interface in a 5G network;

determining that a first user identifier (ID) of a first type of user ID in the second message does not correspond to a mapping in a stored table, the stored table comprising mappings between user IDs of the first type and (i) user IDs of a second type, or (ii) cipher keys;

capturing a transaction transmitted over an N12 interface in the 5G network;

responsive to the determination, extracting, from the transaction, (i) one of an expected response (XRES) or an authentication token (AUTN), (ii) a second user ID, and (iii) a cipher key;

capturing a first message transmitted over an N1 interface in a 5G network; and determining that the first message is associated with the user ID and the cipher key extracted from the transaction.

18. The method of claim 17, further comprising storing the one of the XRES or the AUTN, the user ID, and the cipher key in a storage medium.

19. The method of claim 18, further comprising:

extracting, from the first message, a second one of the XRES or the AUTN that matches the one of the XRES or the AUTN; and retrieving, from the storage medium, the cipher key and the user ID using the second one of the XRES or the AUTN.

20. The method of claim 17, further comprising:

extracting, from the second message transmitted over the N1 interface, a first time that the second message is transmitted; and extracting, from a third message transmitted over the N1 interface, a second time that the third message is transmitted, wherein the transaction is transmitted at a time between the first time and the second time.

\* \* \* \* \*